(12) United States Patent
Makino et al.

(10) Patent No.: US 6,544,009 B2
(45) Date of Patent: Apr. 8, 2003

(54) COMPRESSOR AND ELECTRIC MOTOR

(75) Inventors: Masahiko Makino, Shiga (JP); Tatsuhisa Taguchi, Kusatsu (JP); Yoshifumi Abe, Shiga (JP); Hisakazu Kataoka, Takefu (JP); Yoshinari Asano, Takefu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/819,627

(22) Filed: Mar. 29, 2001

(65) Prior Publication Data
US 2001/0036414 A1 Nov. 1, 2001

(30) Foreign Application Priority Data
Mar. 31, 2000 (JP) .......................... 2000-098888

(51) Int. Cl.7 ...................... F04B 39/00; F04B 53/00
(52) U.S. Cl. ................... 417/312; 417/313; 417/371; 417/423.7; 310/216
(58) Field of Search ................. 310/51, 216, 61; 417/312, 902, 423.1, 423.7, 423.8, 423.14, 410.1, 410.5, 53, 313, 363, 371; 181/403, 202, 229, 200, 207, 256, 282

(56) References Cited

U.S. PATENT DOCUMENTS

| 3,450,338 | A | | 6/1969 | Huttenlocher | 230/206 |
|---|---|---|---|---|---|
| 3,610,784 | A | | 10/1971 | Rundell | 417/415 |
| 3,922,575 | A | * | 11/1975 | Sauer | 310/214 |
| 3,942,055 | A | * | 3/1976 | Hoffmeyer | 310/216 |
| 4,864,177 | A | * | 9/1989 | Yang | 310/216 |
| 4,995,789 | A | * | 2/1991 | Fujio | 417/360 |
| 5,006,045 | A | * | 4/1991 | Shimoda et al. | 417/42 |
| 5,173,629 | A | * | 12/1992 | Peters | 310/216 |
| 5,339,652 | A | * | 8/1994 | Dreiman | 62/296 |
| 5,354,182 | A | * | 10/1994 | Niemiec et al. | 417/363 |
| 5,385,453 | A | * | 1/1995 | Fogt et al. | 417/410.5 |
| 5,514,922 | A | | 5/1996 | Yabushita et al. | 310/45 |
| 5,535,967 | A | * | 7/1996 | Beauchamp et al. | 244/209 |
| 5,747,905 | A | | 5/1998 | Yabushita et al. | 310/89 |
| 5,782,610 | A | * | 7/1998 | Ikeda | 417/53 |

(List continued on next page.)

FOREIGN PATENT DOCUMENTS

| EP | 0887915 | 12/1998 |
|---|---|---|
| EP | 0963900 | 12/1999 |
| GB | 1219348 | 1/1971 |
| JP | 62-18940 | 1/1987 |
| JP | 63-73840 | 4/1988 |
| JP | 3-213681 | 9/1991 |
| JP | 6-26473 | 2/1994 |
| JP | 8-214514 | 8/1996 |
| JP | 9-32729 | 2/1997 |
| JP | 9-32765 | 2/1997 |
| JP | 9-131001 | 5/1997 |
| JP | 10169554 | 6/1998 |
| JP | 11294361 | 10/1999 |
| WO | 98/33260 | 7/1998 |

OTHER PUBLICATIONS

Kutz, Mechanicla Engineers' Handbood 2nd Ed., 1998, John Wiley & Sons, Inc, pp. 45–46 and 60.*

(List continued on next page.)

Primary Examiner—Charles G. Freay
Assistant Examiner—Han L. Liu
(74) Attorney, Agent, or Firm—Greenblum & Bernstein, P.L.C.

(57) ABSTRACT

A compressor and an electric motor in which their weights are successfully reduced by employing a light-metal conductor wire for a winding, by reducing constituent components of a stator and a rotor of the electric motor, by providing a notch or a hole, and by eliminating the need for components necessary to mount the stator in a housing or a casing.

26 Claims, 8 Drawing Sheets

U.S. PATENT DOCUMENTS

| | | | |
|---|---|---|---|
| 5,970,600 A | 10/1999 | Huang et al. ................. | 29/596 |
| 6,002,190 A * | 12/1999 | Kieffer ....................... | 310/216 |
| 6,123,167 A | 9/2000 | Miller et al. ................ | 180/444 |
| 6,194,852 B1 | 2/2001 | Lovatt et al. ............... | 318/254 |
| 6,232,731 B1 | 5/2001 | Chapman .................... | 318/293 |
| 6,244,837 B1 * | 6/2001 | Williams et al. ......... | 417/423.7 |
| 6,335,582 B1 * | 1/2002 | Abukawa et al. ........... | 310/214 |

OTHER PUBLICATIONS

English Language Abstract of JP 63–73840.
English Language Abstract of JP 8–214514.
English Language Abstract of JP 10–169554.
English Language Abstract of JP 3–213681.
Patent Abstracts of Japan, vol. 012, No. 308 (E–647), published Aug. 22, 1988.
English Language Abstract of JP 6–26473.
English Language Abstract of JP 9–32765.
English Language Abstract of JP 9–32729.
English Language Abstract of JP 32–18940.
Finley et al., "An Analytical Approach to Solving Motor Vibration Problems", Petroleum and Chemical Industry Conference, Sep. 13, 1999, pp. 217–232.
English Language Abstract of JP 11–294361.
English Language Abstract of JP 9–131001.

* cited by examiner

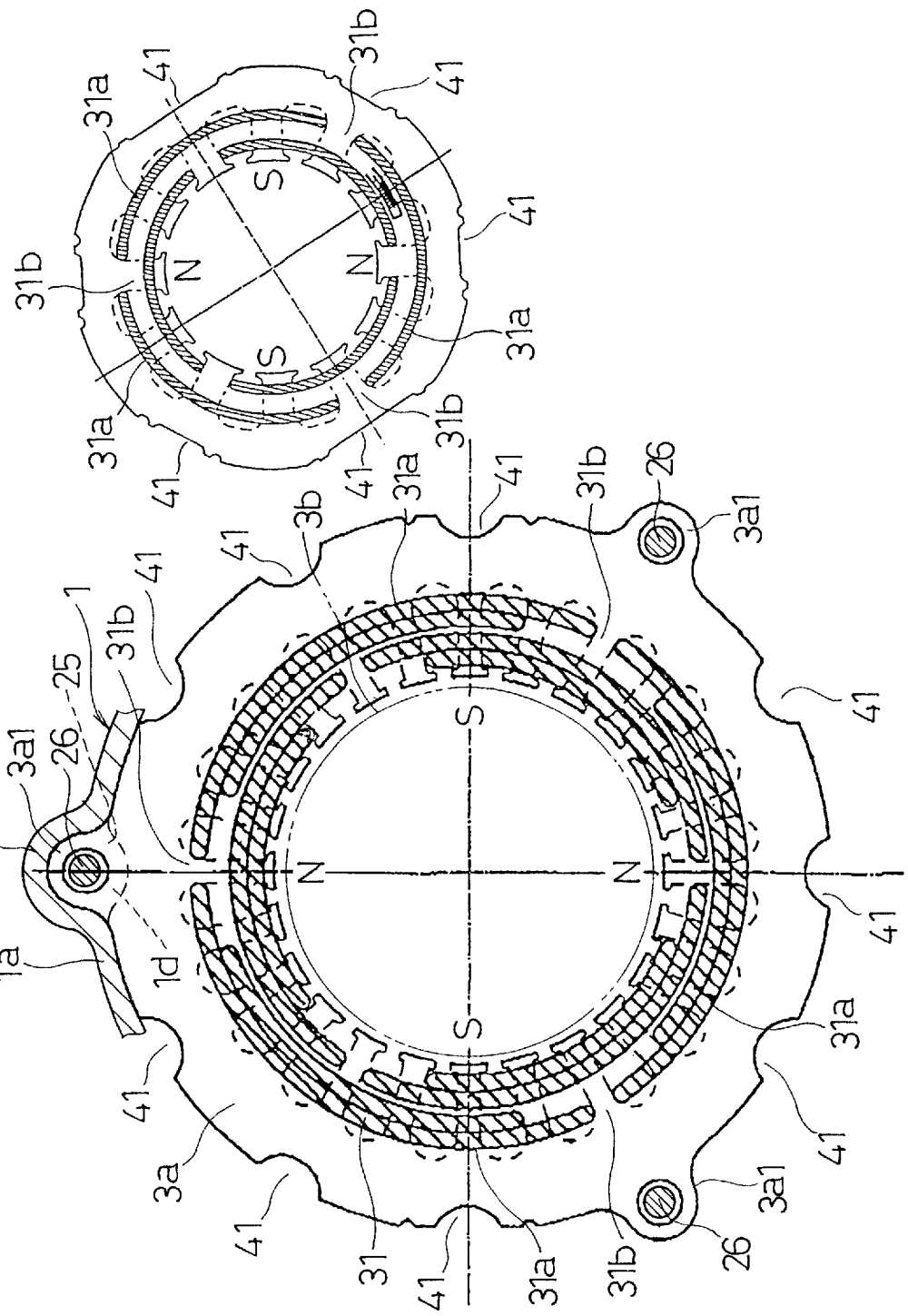

COMPRESSOR AND ELECTRIC MOTOR

BACKGROUND OF THE INVENTION

1. Technical Field of the Invention

The present invention relates to a compressor and an electric motor suitable for same.

2. Description of Related Art

Conventional compressor is unduly heavy for its bulk. This is attributed to an electric motor incorporated therein accounting for one-third to half of the entire system by weight. An electric motor having an unduly large weight is practically undesirable regardless of its uses. However, to date little attention has been paid to weight reduction and no improvements have been made to eliminate such inconvenience.

SUMMARY OF THE INVENTION

The present invention has been devised in view of the above-described problem, and it is an object of the invention to provide a light-weight compressor and an electric motor suitable for the compressor.

To achieve the above object, according to a first aspect of the present invention, a compressor includes an electric motor operating on lower voltages, in which at least the winding of the stator is formed from a light-metal conductor wire having a specific gravity smaller than that of a copper wire.

In this construction, the weight of the entire compressor decreases substantially in proportion to the total volume of the windings. This is because, while the light-metal conductor wire differs from a copper wire in the value of electric resistance and accordingly in the range of effective sectional area properly set for handling lower voltages, it has a specific gravity smaller than that of a copper wire.

Here, using an aluminum wire makes it possible to realize a soft winding and thus facilitates the winding operation and subsequent re-forming operation, as compared with a copper wire. This also helps increase the slot space rate. Further, using a Litz wire as the light-metal wire is particularly preferable in a case where a larger wire diameter is required for the low-voltage electric motor, because the skin effect is less significant.

In a compressor according to a second aspect of the present invention, in order to achieve weight reduction, at least one of the stator and the rotor included in the electric motor has at least one of a cavity, a notch axially arranged continuously or discontinuously, and a hole formed on its surface in the circumferential direction.

In this construction, since the stator and the rotor have a lamination structure, the cavity, notch, or hole is formed with ease from a group of holes drilled in the laminated plate material, of which the cavity may be formed so as to lie scattered therearound as desired. The cavity, notch, and hole are essentially different than a cooling hole formed in the stator or rotor of a conventional compressor designed for a refrigeration cycle. The latter is formed for the purpose of cooling the electric motor by passing a refrigerant therethrough. That is, the former can be made as large as possible in size and number insofar as strength, safety, electric motor efficiency, and other factors concerning the compressor are maintained at adequate levels. The weight of the entire compressor decreases in proportion to the total volume of the cavity, notch, or hole.

In a compressor according to a third aspect of the present invention, at least one of the stator and the rotor included in the electric motor has one of a notch and a hole formed on its surface in the circumferential direction. The notch or hole acts as an axial sound deadening path for conveying a refrigerant.

In this construction, the axial notch or hole can be made larger in size and number than a conventional cooling hole. This makes it possible to reduce the weight of the compressor to a minimum. Simultaneously, this helps increase the passage area of the sound deadening path and thus obtain sufficient refrigerant noise suppression effect.

The sound deadening path may preferably be realized as a path extending forwardly only partway and having its opening in the refrigerant admission direction, as a path which is so shaped that its width decreases gradually from its refrigerant-admission side to its refrigerant-discharge side, or as a through path having an expansion chamber partway along its length. A sound deadening path thus designed exerts interference- or expansion-based excellent noise suppression characteristics.

In a compressor according to a fourth aspect of the present invention, an iron-based stator is bolted to a stepped surface of the inner periphery of an aluminum housing at three positions around its outer periphery.

This construction requires one fewer bolted positions in contrast to conventional cases where a stator needs to be bolted to a housing at four positions because it cannot be shrinkage-fitted thereto for reasons of material of the housing and the stator. This helps reduce the number of bolts and thick-walled portions necessary for bolting. This in turn helps reduce the weight of the entire compressor, as well as the number of constituent components and assembly man-hours, thereby achieving cost reduction.

Moreover, where the winding of the stator is formed from a star-shaped three-phase winding, it may preferably be wound in parallel. This makes it possible to create three boundary portions for the winding groups arranged along the circumferentially outermost portion of the stator. Then, by arranging the above-described bolted positions so that they face their corresponding boundary portions, any possible mutual interference of the winding groups can be avoided. Thus, there is no need for the bolted portions to protrude greatly outward to avoid such interference. This makes the stator smaller and thus helps reduce the weight of the electric motor.

In a compressor according to a fifth aspect of the present invention, the electric motor has an iron-based stator cast in the inner periphery of an aluminum housing.

In this way, the need for a bolt and a thick-walled portion necessary for bolting is eliminated, thereby leading to a reduction in the weight of the entire compressor. Simultaneously, this helps reduce the number of constituent components and assembly man-hours, thereby achieving cost reduction.

Any of the above-described compressors employs, as a power source, a battery which is moved concomitantly therewith, and has an electric motor and a compression mechanism driven by the electric motor housed in a housing. Such a construction is suitable for use as an air-conditioning mechanism in vehicles ranging up to large-sized passenger cars.

BRIEF DESCRIPTION OF THE DRAWINGS

FIGS. 2A and 2B are end views schematically illustrating the winding employed for the stator of the electric motor accommodated in the compressor shown in FIG. 1, with FIG. 2A showing a 24-slot winding, and FIG. 2B showing a 12-slot winding;

DETAILED DESCRIPTION OF THE PREFERRED EMBODIMENTS

Figure 1:
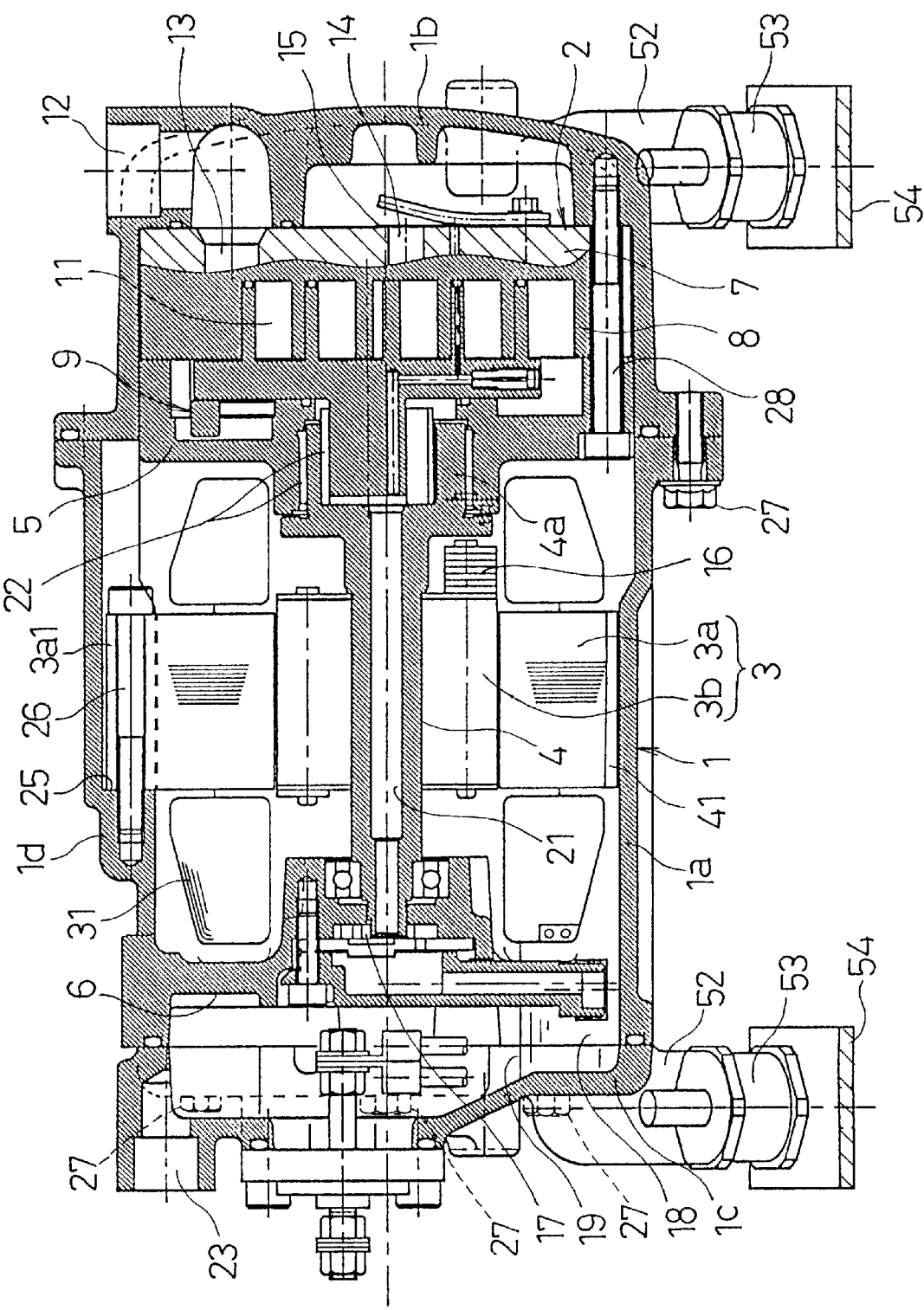
FIG. 1 is a sectional view illustrating the configuration of a compressor according to one embodiment of the present invention.

FIG. 1 shows a scroll-type compressor according to one embodiment of the invention. The compressor has a housing 1 for accommodating a compression mechanism 2 and an electric motor 3 for driving same through a crank shaft 4. The crank shaft 4 includes a main shaft 4a on its one end on the side of the compression mechanism 2. On one side in a lengthwise direction in the housing 1 is a main bearing member 5, while a sub bearing member 6 is provided on the other side within the housing 1, for supporting the opposite ends of the crank shaft 4.

A stationary scroll 7 is bolted to the main bearing member 5. Between the main bearing member 5 and the stationary scroll 7 is inserted a rotating scroll 8, which meshes with the stationary scroll 7 so as to form a scroll-type compression mechanism 2. Between the rotating scroll 8 and the main bearing member 5 is disposed a rotation restricting mechanism 9 such as an Oldham's ring or the like for preventing the rotating scroll 8 from rotating and for guiding it in circular orbital motion. By the action of the main shaft 4a of the crank shaft 4, the rotating scroll 8 is driven to be decentered, and thereby circular orbital motion is imparted to the rotating scroll 8. At this time, a compression chamber 11, formed between the stationary scroll 7 and the rotating scroll 8, is moved from the outer periphery side to the central region, with a gradual reduction of the volume thereof. A refrigerant, introduced from an inlet-side connection port 12 communicating with outside through the housing 1 and from an inlet hole 13 formed on the outer peripheral portion of the stationary scroll 7, is subjected to compression. The refrigerant, upon compressed to a predetermined volume or above, pushes a reed valve 15 open and is discharged from a discharge port 14 disposed in the central portion of the stationary scroll 7 into the housing 1.

An electric motor 3 is located between the main bearing member 5 and the sub bearing member 6, and is composed of a stator 3a fixedly attached to the housing 1 and a rotor 3b formed integrally around the outer periphery of the central portion of the crank shaft 4. The rotor 3b has a balance weight 16 formed in the outer peripheral portion of its upper and lower end faces. Providing the balance weight 16 assures high stability in the rotary motion of the rotor 3b and the crank shaft 4, and thereby stable circular orbital motion is imparted to the rotating scroll 8.

A pump 17 is provided at one end of the crank shaft 4 opposite from the main shaft 4a. Oil 19 is sucked from an oil reservoir 18 disposed at the bottom portion of the housing 1 into the pump 17, and is supplied through an oil feeding hole 21 piercing through the crank shaft 4 to bearing portions 22 of the components constituting the compression mechanism 2 and the sliding portions of the compression mechanism 2. The oil 19 having passed therethrough is subjected to supply pressure, gravity, or the like, and thereby flows through the bearing portion 22 into the housing 1, and then drips and eventually collects in the oil reservoir 18.

Refrigerant gas discharged from the compression mechanism 2 passes through and thereby cools the electric-motor 3. Then, the refrigerant gas is discharged through a connection port 23 to the outside of the housing 1 so as to serve for the refrigeration cycle.

The housing 1 is formed as a pressure-tight container and is thus thick-walled. Therefore, if it is made of an iron-based material, an undesirable increase in the weight is unavoidable. To achieve weight reduction, this embodiment of the invention employs, for the housing of the compressor, a light-metal material having a specific gravity smaller than that of an iron-based material, for example, aluminum. A housing made of aluminum needs to have a thicker wall than an iron-based housing and is nevertheless advantageous from a weight standpoint. However, with another features of the present invention, using an iron-based material may not lead to any serious problem in achieving weight reduction, and therefore a metal material used for the housing 1 is not limited to light metal.

The housing 1 is made of light metal and thus cannot be shrinkage-fitted to the iron-based stator 3a. Therefore, the stator 3a is, at several positions around its circumferential surface, fixed by bolts 26 to a stepped surface 25 formed in an inner surface of the body 1a of the housing 1. The housing 1 is composed of the body 1a and panels 1b and 1c. The panels 1b and 1c are fixed to each end thereof at several positions around their circumferential surfaces by bolts 27. The main bearing member 5 is fitted tightly in the inner periphery of the panel 1b disposed on the side of the compression mechanism 2. Between the main bearing member 5 and the panel 1b is inserted the stationary scroll 7 with a tight fit and fixed by a bolt 28. The sub bearing member 6 is formed integrally with the body 1a of the housing 1. However, the entire construction of the present invention is not limited to the concrete example described above; it may include, except for those described hereinafter, any conventionally-known or later-disclosed structural combination.

Figure 9:
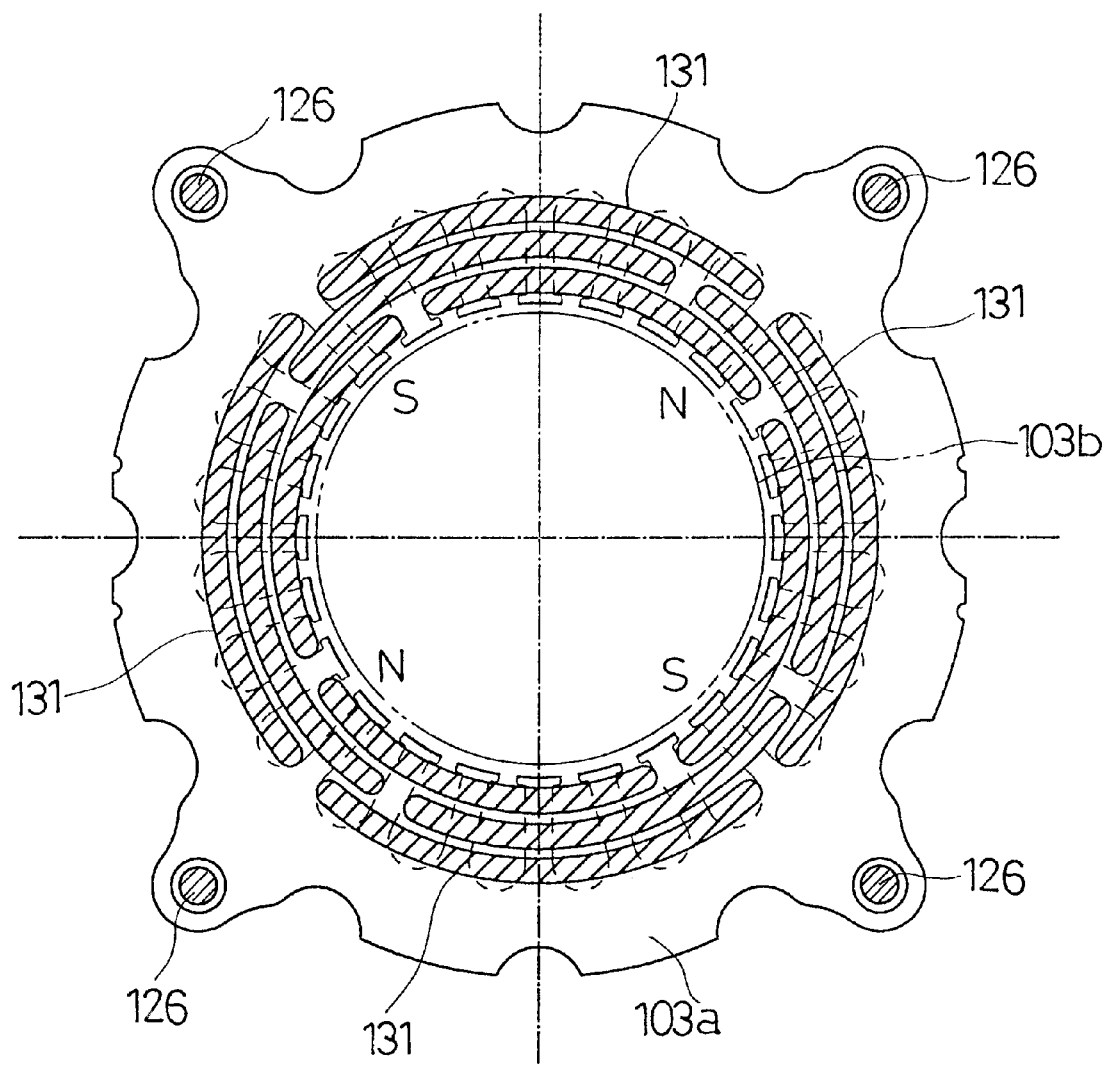
FIG. 9 is an end view of the winding of the stator employed in a conventional compressor, illustrating schematically the structure realized by means of bolting.

In this embodiment, as shown in FIG. 2A, the stator 3a is, at equally spaced three positions around its outer circumferential surface, bolted to the housing 1. By contrast, as shown in FIG. 9, a conventional stator 103a is fixed to a housing at four positions by bolts 126. That is, this embodiment of the invention requires one fewer bolted portions than the conventional case. This helps reduce the number of bolts 26 and the thick-walled portions 1d and 3a1 of the body 1a of the housing 1 and the stator 3a formed for bolting shown in FIGS. 1 and 2A. This in turn helps reduce the weight of the entire compressor, as well as the number of constituent components and assembly man-hours, thereby achieving cost reduction.

Moreover, as shown in FIGS. 2A and 2B, in the electric motor 3 of the present invention, the stator 3a is so designed that, when it is used with the rotor 3b of conventional type that carries four magnetic poles formed by permanent magnets or the like, there is no possibility of occurrence of the moment at which its three bolted positions and the plurality of magnetic poles of the rotor 3b are concurrently opposed to one another. This solves the following problem. In the conventional electric motor shown in FIG. 9, the four bolted positions of the stator 103a and the four magnetic poles of the rotor 103b are concurrently opposed to one another. This inconveniently causes the bolted positions to coincide with the positions at which the vibrational antinode would occur located at intervals of 90°, resulting in undesirable resonance. In other words, at the time when the magnetic flux generated by the rotor 3b and the magnetic poles of the stator 3a are opposed to one another, vibration takes place as illustrated in FIGS. 3B and 3C, of which FIG. 3B shows the mode of vibration observed in two-pole configuration, and FIG. 3C shows the same observed in four-pole configuration. In view of the foregoing, as shown in FIG. 2A, the bolted portions are arranged at circumferentially equi-spaced three positions. This arrangement inhibits each bolt hole provided for bolting from coinciding with the node of the vibration mode, and thereby prevents the occurrence of vibration.

Figure 3A:
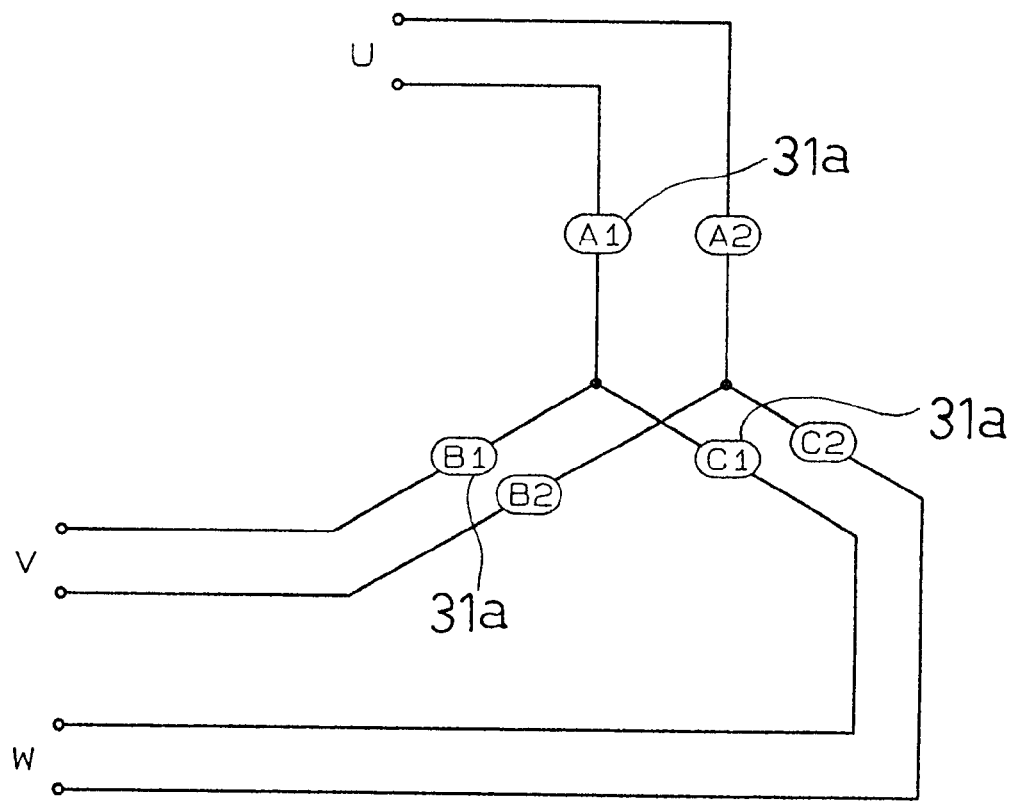
FIG. 3A is a connection diagram of the winding shown in FIG. 2A, and FIGS. 3B and 3C are views of assistance in explaining the conditions of vibration observed in a 2-pole rotor and a 4-pole rotor, respectively.
Figures 3B, 3C:
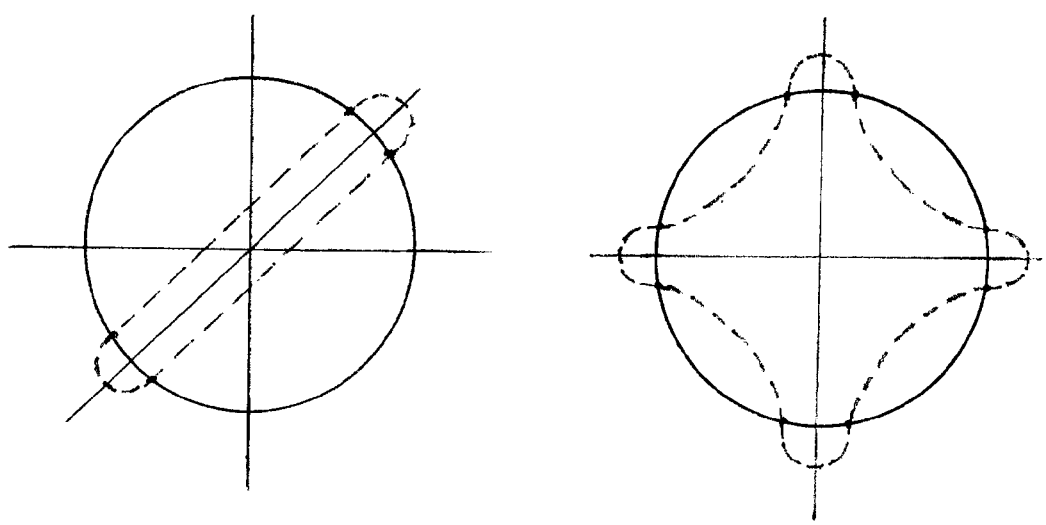
Figure 10:
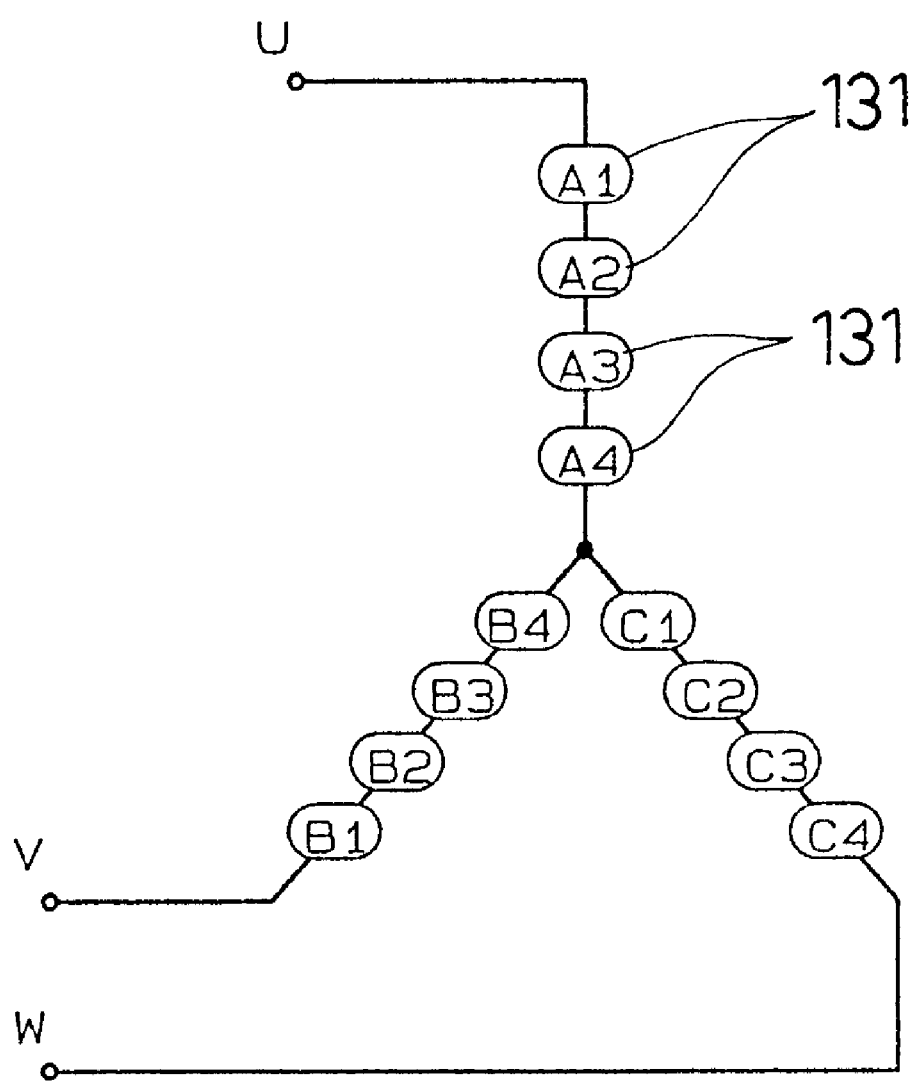
FIG. 10 is a connection diagram of the winding shown in FIG. 9.

Further, as shown in FIG. 3A, the winding 31 of the stator 3a is formed from a star-shaped three-phase winding. In this connection, as shown in FIGS. 2A and 3A, by forming the winding 31 into a parallel winding, it is possible to create boundary portions 31b at three equi-spaced positions on the boundaries among groups of windings 31a arranged along the circumferentially outermost portion. As shown in FIGS. 2A and 2B, by arranging the above-described bolted positions so that they individually face their corresponding boundary portions 31b, any possible mutual interference of the winding groups 31a can be avoided. Thus, there is no need for the bolted portions to protrude greatly outward. This helps reduce the thickness of the above-mentioned thick-walled portions 1d and 3a1 and thereby reduce the weight of the electric motor. An adequate distance is provided between the head portion of the bolt 26 and the winding 31 to secure insulation therebetween. This can be achieved by re-forming the winding groups 31a, or fixing them with a bind thread or varnish. In the conventional example shown in FIGS. 9 and 10, the star-shaped three-phase winding is wound in series so that the four bolted positions individually face their corresponding boundary portions of the four winding groups 131 arranged along the outermost periphery. FIG. 2A shows the winding position of the winding group 31a wound in 24 slots, and FIG. 2B shows the winding position of the winding group 31a wound in 12 slots. In a case where the teeth are arranged at an uneven pitch on an as needed basis, the boundary portions 31b do not necessarily have to be equi-spaced so long as they are properly arranged so as to face their corresponding bolted positions.

Figure 4:
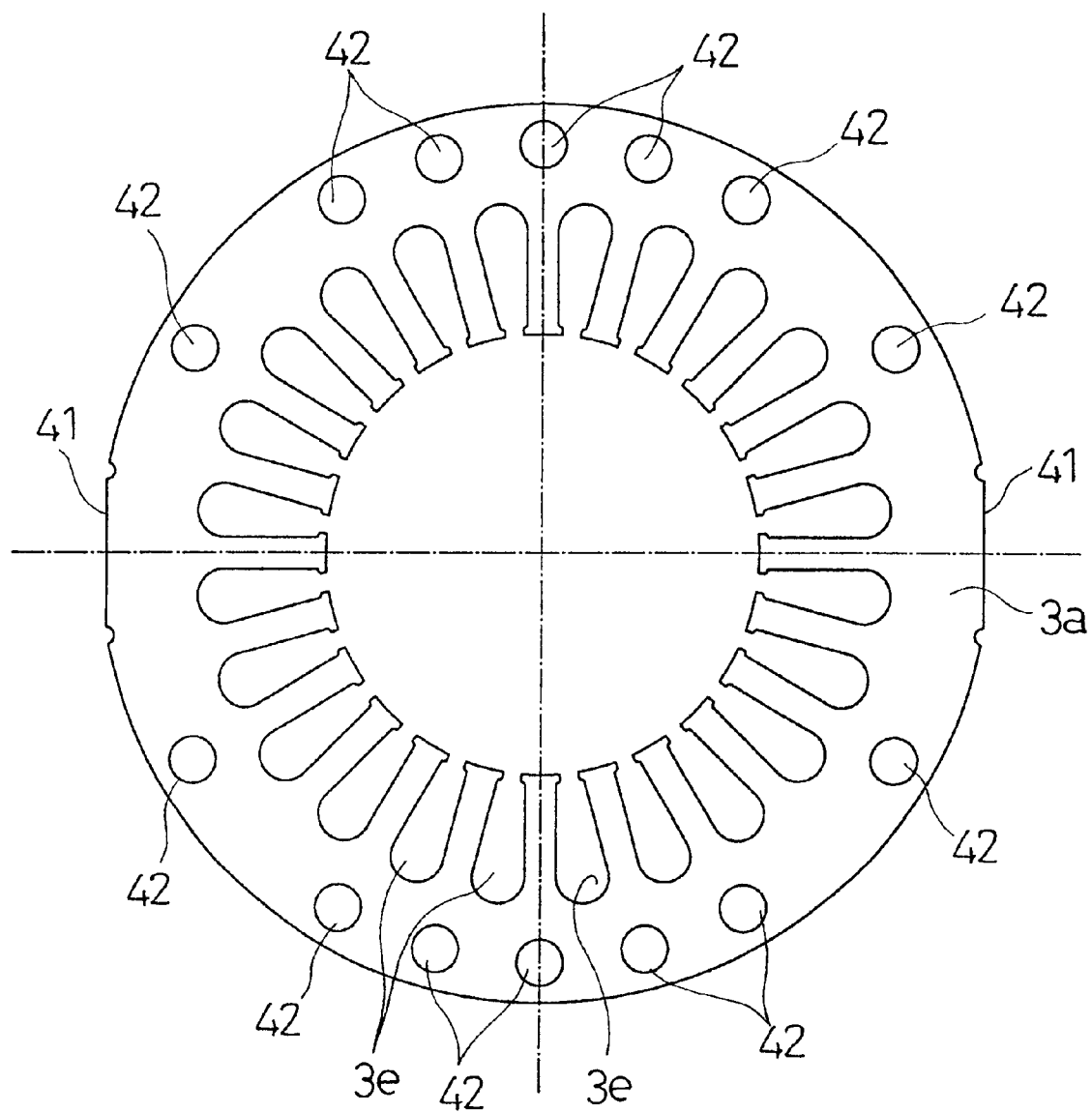
FIG. 4 is an end view illustrating another example of the stator while the winding is omitted.
Figure 5:
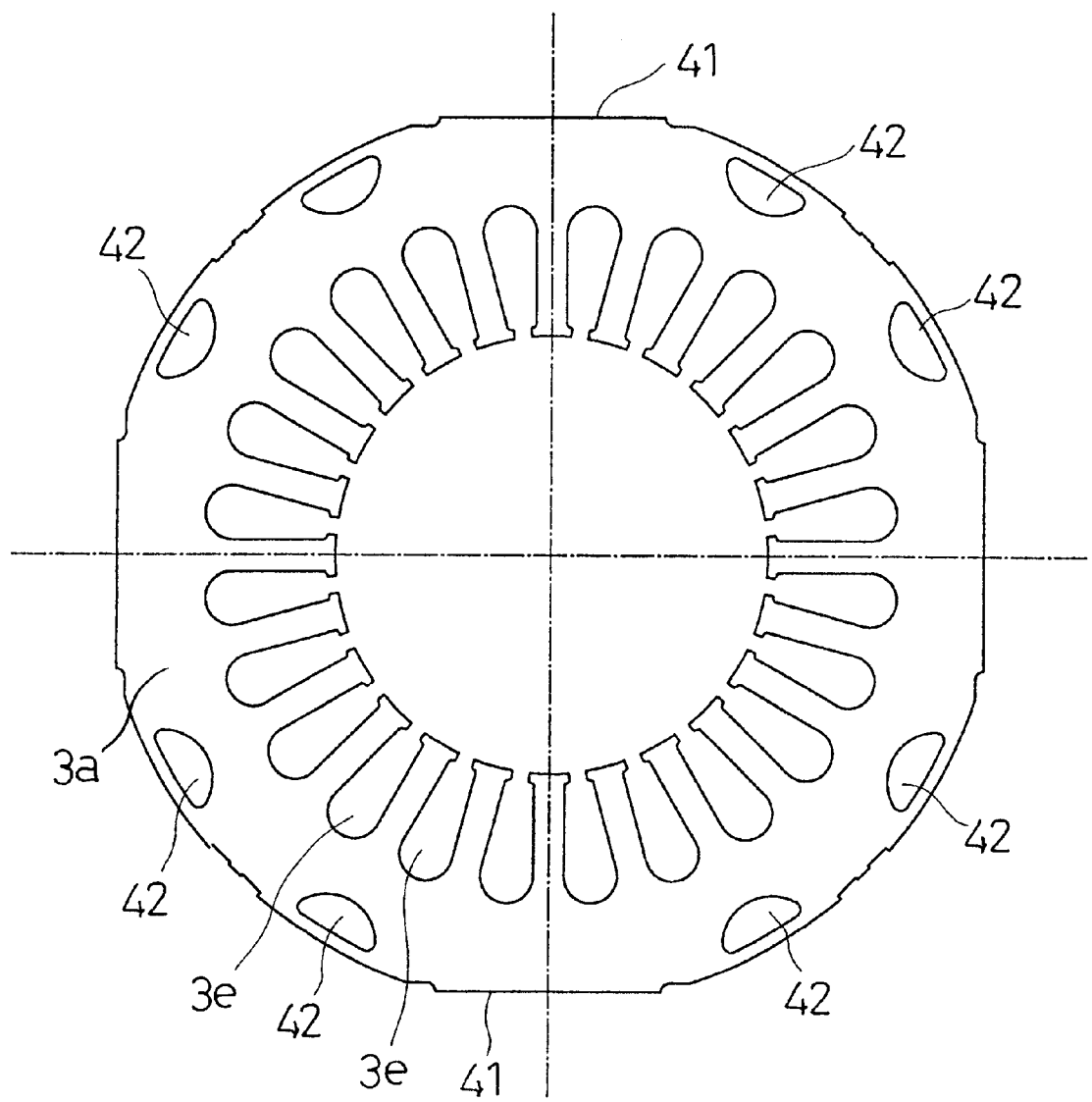
FIG. 5 is an end view illustrating still another example of the stator while the winding is omitted.

In order to achieve weight reduction, at least one of the stator 3a and the rotor 3b of the electric motor 3 has at least one of a cavity, a notch axially arranged continuously or discontinuously, and a hole formed on its surface in the circumferential direction. In the example shown in FIGS. 1, 2A and 2B, the stator 3a has, in several positions around its outer periphery, a series of notches 41 arranged continuously. In the example shown in FIGS. 4 and 5, the stator 3a has, around its outer periphery, a plurality of notches 41 and holes 42 arranged continuously or penetrating completely.

As shown in these figures, these notches 41 and holes 42 are so arranged as to face their corresponding boundary portions of the slots 3e in order to avoid interference with the winding 31 in the stator 3a. In a case where the holes 42 are formed in the rotor 3b, the arrangement position and the size thereof may preferably be so determined as to achieve well-balanced rotary motion around the crank shaft 4. This eliminates the need for a balance weight 16 or makes its configuration simple.

In this construction, since the stator 3a and the rotor 3b have a lamination structure, the cavity, the notch 41, and the hole 42 are formed with ease from a group of holes drilled in the laminated plate material, of which the cavity may be formed so as to lie scattered therearound as desired. The cavity, the notch 41, and the hole 42 are essentially different than the notch and cooling hole formed in the stator or rotor of a conventional compressor designed for a refrigeration cycle. The latter are formed for the purpose of achieving oil separation and cooling of the electric motor by passing a refrigerant therethrough. That is, the former can be made as large as possible in size and number insofar as strength, safety, electric motor efficiency, and other factors concerning the compressor are maintained at adequate levels. The weight of the entire compressor decreases in proportion to the total volume of the cavity, the notch 41, and the hole 42.

Figure 6:
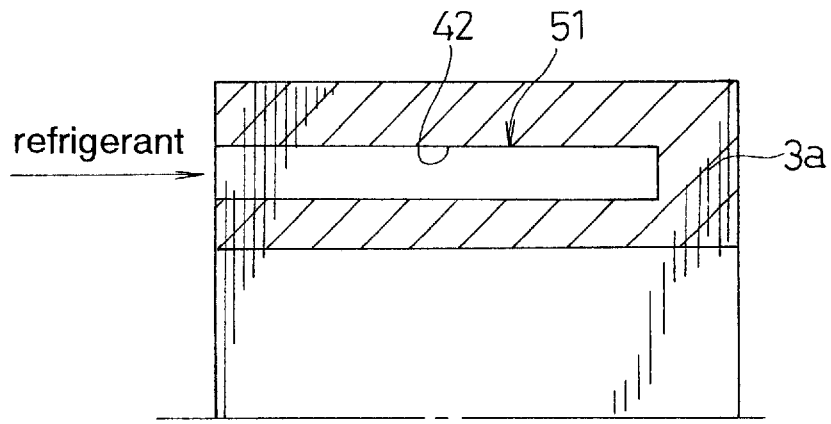
FIG. 6 is a sectional view illustrating the stator having a sound deadening path.
Figure 7:
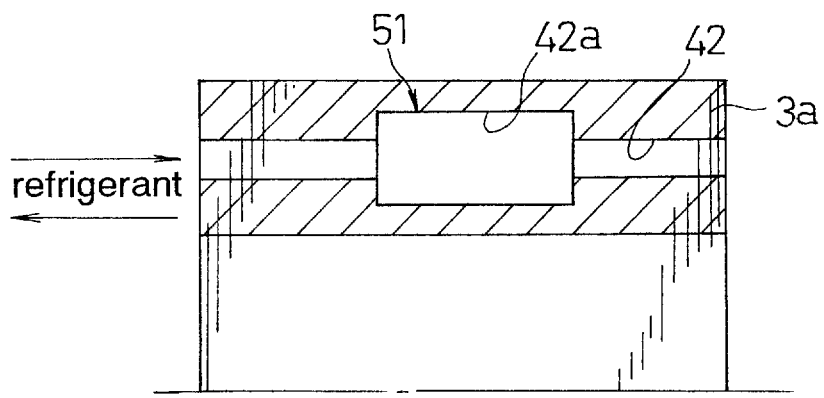
FIG. 7 is a sectional view illustrating the stator having a sound deadening path of another type.
Figure 8:
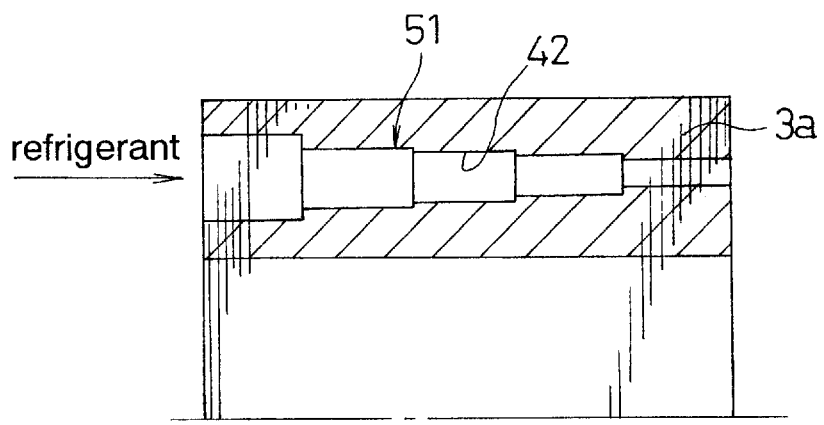
FIG. 8 is a sectional view illustrating the stator having a sound deadening path of still another type.

Further, at least one of the notch 41 and the hole 42 thus designed can be provided in the circumferential direction to form an axial sound deadening path for conveying a refrigerant. In the example shown in FIG. 6, as an interference-based sound deadening path 51, a hole 42 is provided that is interrupted halfway and receives a refrigerant flowing in the direction indicated by an arrow. In the example shown in FIG. 7, as the sound deadening path 51, a hole 42 is so formed as to have an expansion chamber 42a partway along its length and is capable of functioning for a refrigerant irrespective of its flowing direction (as indicated by two arrows). In the example shown in FIG. 8, as the sound deadening path 51, a hole 42 is so shaped that its width decreases gradually from one end to the other end. Here, a refrigerant is introduced from the larger opening thereof and is then discharged from the smaller opening. The sound deadening path 51 thus designed may be formed between the notch 41 and the housing 1. These holes are drilled in the laminated steel plate during the punching operation with a cutting tool separately provided therefor.

The axial notch 41 or the hole 42 can be made larger in size and number than a conventional cooling hole. That is, it is possible to increase the passage area of the sound deadening path 51 and thus obtain sufficient refrigerant noise suppression effect.

In this embodiment, since the electric motor 3 is designed to operate on lower voltages for application purposes, at least the winding 31 of the stator 3a is formed from a light-metal conductor wire having a specific gravity smaller than that of a copper wire. Similarly, where the rotor 3b also has a winding, by forming the winding from a light-metal conductor wire, it is possible to achieve further weight reduction.

The panels 1b and 1c of the housing 1 each have a leg 52 formed integrally therewith. The leg 52 is coupled through a damping block 53 to a mounting seat 54. In contrast to a case where the panels 1b and 1c are each provided with a bracket, and this bracket is coupled through the damping block to the mounting seat, this structure requires fewer constituent components and assembly man-hours. As a result, not only weight reduction but also cost reduction can be achieved.

While the light-metal conductor wire differs from a copper wire in the value of electric resistance and accordingly in the range of effective sectional area properly set for handling lower voltages, it has a specific gravity smaller than that of a copper wire. Accordingly, the weight of the compressor and the electric motor decreases substantially in proportion to the total volume of the windings 31. The low-voltage electric motor is used at, for example, 50V or below and at 50A or above, and its maximum power output is set at nearly 2500W. Such a construction is suitable for use as an air-conditioning mechanism in vehicles ranging up to large-sized passenger cars in which a battery is used as a power source for driving the electric motor 3.

As a light-metal conductor wire which satisfies the above requirements, it is preferable to use an aluminum wire having effective sectional area ranging from 5 mm² to 10 mm² from the viewpoint of prevention of fusion and energization efficiency. Using an aluminum wire provides approximately a 20 to 30% drop in the weight. Moreover, the use of aluminum wires makes it possible to make the winding 31 soft and thus facilitates the winding operation and subsequent re-forming operation, as compared with a copper wire. Further, using a Litz wire as the light-metal wire is particularly preferable in a case where a larger wire diameter is required for the low-voltage electric motor, because it is free from reduction in effective sectional area.

Now, a description will be given below as to the relationship between skin effect and wire diameter. The skin effect obtained in cases where electric current is supplied at a high frequency is defined by the following formula.

Formula (1) provides that:

$$\delta = \sqrt{\frac{2}{\omega\mu\sigma}} \quad (1)$$

where $\delta$ represents the skin thickness; $\omega$ represents the angular frequency; $\mu$ represents the permeability; and $\sigma$ represents the conductivity.

The values of $\mu$ and $\sigma$ observed in aluminum and copper are shown in Table 1.

TABLE 1

| | Conductivity[S/m] | Permeability[H/m] |
|---|---|---|
| Aluminum [mm] | 3.96 E+07 | 1.25666 E−06 |
| Copper [mm] | 5.76 E+07 | 1.25663 E−06 |

Based on the values shown in Table 1, the relationship between the career frequency and the skin thickness is defined by the formula: $\omega=f/2\pi$ (f: career frequency). Then, the following formula and table hold:

TABLE 2

δ: the skin thickness (mm)

$$\delta = \sqrt{\frac{2}{\omega\mu\sigma}}$$

| | Career frequency [KHz] | 2.75 | 3.0 | 4.0 | 5.0 | 10.0 | 20.0 |
|---|---|---|---|---|---|---|---|
| δ | Aluminum | 1.53 | 1.46 | 1.26 | 1.13 | 0.80 | 0.57 |
| | Copper | 1.26 | 1.21 | 1.05 | 0.94 | 0.66 | 0.47 |

In general, the career frequency is set to a range of about 2.5 KHz to 20 KHz. For example, where the career frequency is set at 5 KHz, it is preferable to employ a Litz wire having a core diameter of φ1.88 mm or below.

Although several configurations are herein disclosed that are useful to achieve sufficient weight reduction, adopting only one of them makes it possible to achieve reduction in the moving load in the compressor and the electric motor used for applications involving movement. This contributes to the conservation of energy. It is needless to say, however, that more than one configurations may preferably be adopted to obtain further advantages. Moreover, also in cases where the compressor and the electric motor are used for applications independent of movement, weight reduction is of great desirability in terms of its portability and handling.

Although not shown in the figures, in cases where the stator 3a of the electric motor 3 is made of an iron-based material, and the housing 1, in particular, its body 1a, is made of aluminum, it is possible to adopt a construction in which the stator 3a is cast in the inner periphery of the body portion 1a of the housing 1. In this way, the housing 1 is, when molded, provided integrally with the stator 3a without performing bolting. This eliminates the need for a bolt or a thick-walled portion necessary for bolting and thus leads to a reduction in the weight of the compressor as a whole. This also helps reduce the number of constituent components and assembly man-hours, thereby achieving cost reduction.

As described heretofore, according to the present invention, there are provided a compressor and an electric motor that are lighter in weight. These constructions, when used for applications involving movement, allow reduction in the moving load and thus make a notable contribution to the conservation of energy. It is of course possible to attain practical advantages when they are used for applications independent of movement.

It should also be noted that the application of the present invention is not limited to the above-described scroll-type compressor. For example, the invention is applicable to various types of compressors having a compression mechanism of rotary-type, reciprocating-type, or any other type, and an electric motor for driving the compression mechanism combined together, or applicable to a construction employing a vertical compression mechanism.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A compressor, comprising
    a housing;
    a compression mechanism accommodated in the housing; and
    a low-voltage electric motor that drives the compression mechanism, the electric motor including a rotor and a stator, the stator having a winding comprising an aluminum light-metal conductor wire having effective sectional area within a range of 5 mm² to 10 mm² and having a specific gravity smaller than that of a copper wire.

2. The compressor according to claim 1, wherein the electric motor is used at 50V and not lower than 50A.

3. The compressor according to claim 2, wherein the light-metal conductor wire is a Litz wire.

4. The compressor according to claim 1, wherein the compressor is driven by a battery movable concomitantly therewith.

5. A compressor comprising:

a housing;

a compression mechanism accommodated in the housing; and an electric motor including a rotor and a stator that drive the compression mechanism, at least one of the stator and the rotor of the electric motor having at least one of cavities axially extending notches and holes formed on a surface thereof in a circumferential direction to achieve weight reduction, wherein one of the notches and the holes forms an axial sound deadening path for conveying a refrigerant therethrough.

6. The compressor according to claim 5, wherein the sound deadening path is formed such as to have an opening in a refrigerant admission direction and is interrupted halfway.

7. The compressor according to claim 5, wherein the sound deadening path is so shaped that its width decreases from a refrigerant-admission side thereof to a refrigerant-discharge side thereof.

8. The compressor according to claim 5, wherein the sound deadening path is a through path which has an expansion chamber partway along its length.

9. The compressor according to claim 5, wherein the compressor is driven by a battery movable concomitantly therewith.

10. A compressor, comprising a housing made of aluminum;

a compression mechanism accommodated in the housing; and an electric motor for driving the compression mechanism, the electric motor including a rotor and a stator made of iron-based material and bolted to a stepped surface of an inner periphery of the housing at equally-spaced three positions around an outer periphery thereof.

11. The compressor according to claim 10, wherein the rotor has two or four magnetic poles.

12. The compressor according to claim 10, wherein the stator has a star-shaped three-phase winding and is wound in parallel, and wherein the bolted positions are so located as to face their corresponding boundary portions of winding groups arranged along a circumferentially outermost portion of the stator.

13. The compressor according to claim 10, wherein the compressor is driven by a battery movable concomitantly therewith.

14. A compressor, comprising a housing made of aluminum;

a compression mechanism accommodated in the housing; and an electric motor for driving the compression mechanism, the electric motor including a rotor and a stator made of iron-based material and cast in an inner periphery of the housing.

15. The compressor according to claim 14, wherein the compressor is driven by a battery movable concomitantly therewith.

16. A low-voltage electric motor, comprising a rotor and a stator, the stator having a comprising an aluminum light-metal conductor wire having effective sectional area within a range of 5 mm$^2$ to 10 mm$^2$ and having a specific gravity smaller than that of a copper wire.

17. The electric motor according to claim 16, wherein the electric motor is used at 50V or below and at 50A or above.

18. The electric motor according to claim 17, wherein the light-metal conductor wire is a Litz wire.

19. An electric motor, comprising a rotor and a stator, at least one of the stator and the rotor having at least one of cavities, axially extending notches, and holes formed on a surface thereof in a circumferential direction to achieve weight reduction, wherein one of the notches and the holes forms an axial sound deadening path for conveying a refrigerant therethrough.

20. The electric motor according to claim 19, wherein the sound deadening path is formed such as to have an opening in a refrigerant admission direction and is interrupted halfway.

21. The electric motor according to claim 19, wherein the sound deadening path is so shaped that its width decreases gradually from a refrigerant-admission side thereof to a refrigerant-discharge side thereof.

22. The electric motor according to claim 19, wherein the sound deadening path is a through path which has an expansion chamber partway along its length.

23. An electric motor, comprising:

a casing made of aluminum; and a stator and a rotor each accommodated in the casing, the stator being made of iron-based material and bolted to a stepped surface of an inner periphery of the casing at equally-spaced three positions around an outer periphery thereof.

24. The electric motor according to claim 23, wherein the rotor has two or four magnetic poles.

25. The electric motor according to claim 24, wherein the stator has a star-shaped three-phase winding and is wound in parallel, and wherein the bolted positions are so located as to face their corresponding boundary portions of winding groups arranged along a circumferentially outermost portion of the stator.

26. An electric motor, comprising:

a casing made of aluminum; and a stator and a rotor each accommodated in the casing, the stator being made of iron-based material and cast in an inner periphery of the casing.

* * * * *

UNITED STATES PATENT AND TRADEMARK OFFICE
CERTIFICATE OF CORRECTION

PATENT NO.    : 6,544,009 B2
DATED         : April 8, 2003
INVENTOR(S)   : M. Makino et al.

It is certified that error appears in the above-identified patent and that said Letters Patent is hereby corrected as shown below:

Column 9,
Line 9, "cavities" should be -- cavities, --.
Line 9, "notches" should be -- notches, --.

Column 10,
Line 5, after "having a" insert -- winding --.

Signed and Sealed this

Twenty-third Day of December, 2003

JAMES E. ROGAN
*Director of the United States Patent and Trademark Office*